No. 795,398. PATENTED JULY 25, 1905.
R. C. LASTER.
COTTON CHOPPER AND CULTIVATOR.
APPLICATION FILED MAR. 28, 1905.
2 SHEETS—SHEET 2.
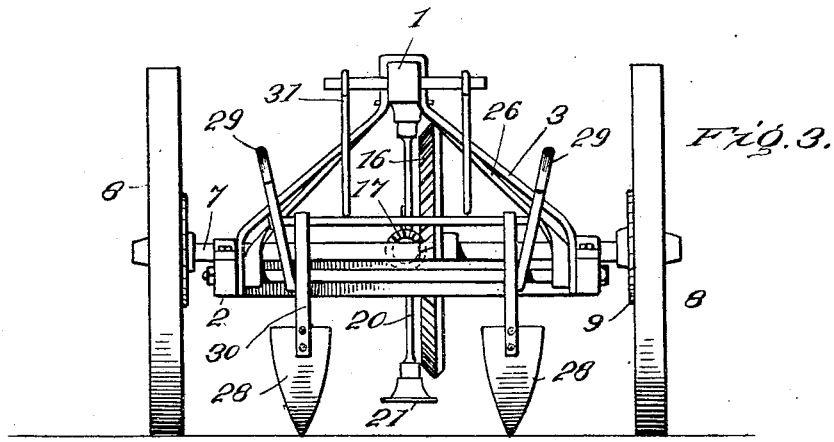
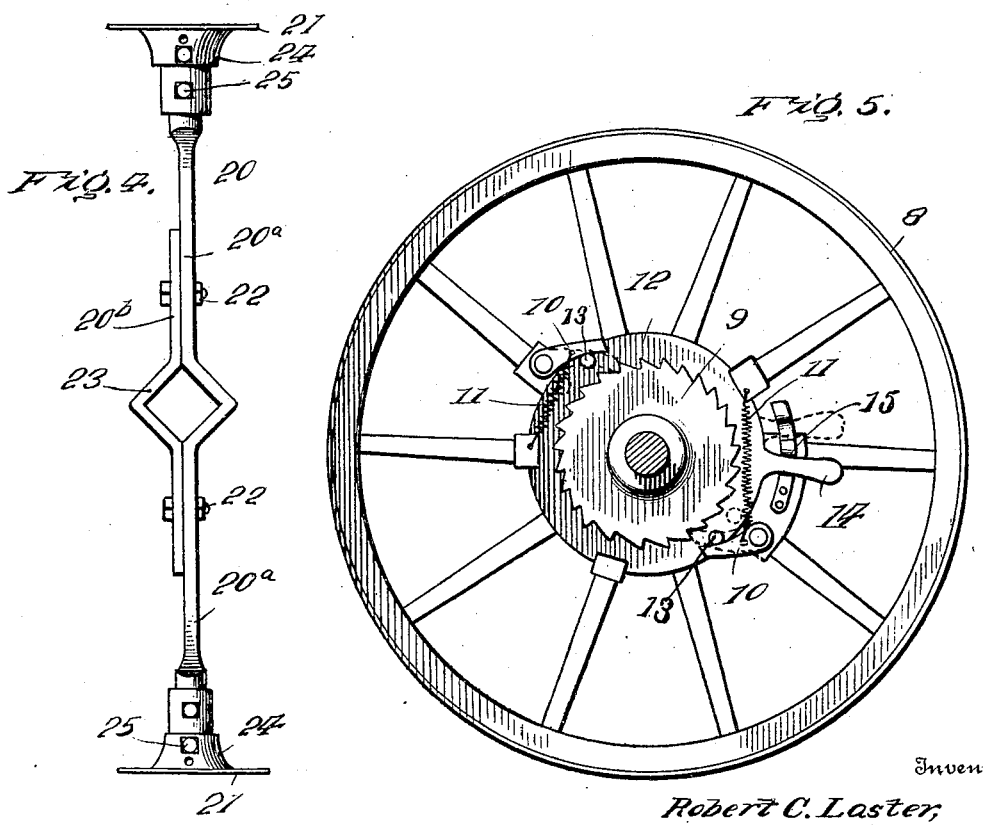
Witnesses
L. H. Schmidt
Inventor
Robert C. Laster
By R. A. B. Lacey, Attorneys

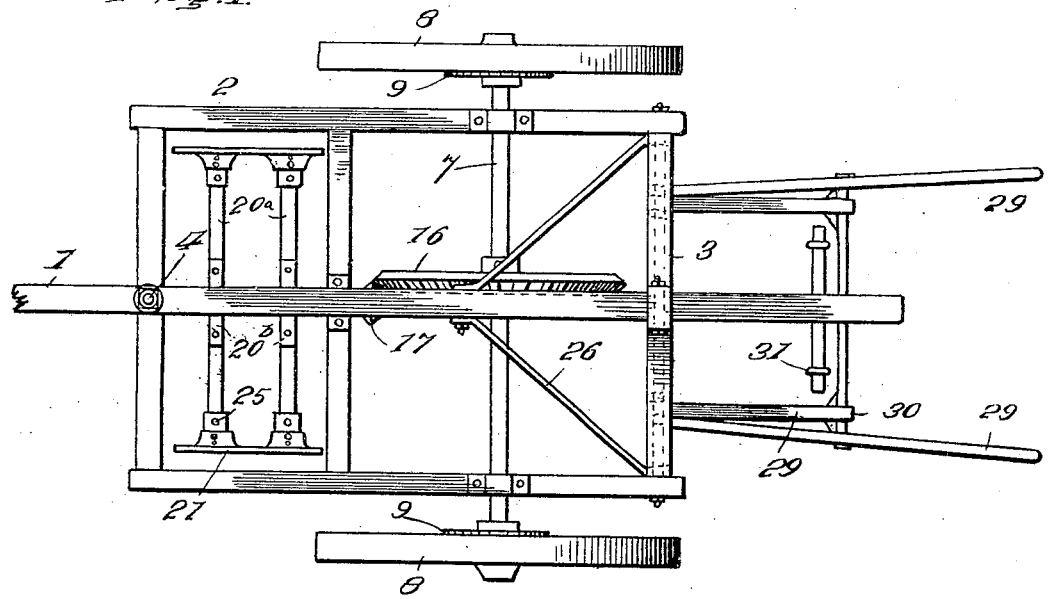

UNITED STATES PATENT OFFICE.

ROBERT C. LASTER, OF HUNT, ARKANSAS.

COTTON CHOPPER AND CULTIVATOR.

No. 795,398. Specification of Letters Patent. Patented July 25, 1905.

Application filed March 28, 1905. Serial No. 252,554.

*To all whom it may concern:*

Be it known that I, ROBERT C. LASTER, a citizen of the United States, residing at Hunt, in the county of Johnson and State of Arkansas, have invented certain new and useful Improvements in Cotton Choppers and Cultivators, of which the following is a specification.

This invention relates to improvements in that class of agricultural implements commonly called "cotton-choppers," and aims to provide a means for this type particularly designed for simultaneously thinning and cultivating rows of cotton-plants any desired width or space in the rows of cotton or other growth.

The invention includes chopping mechanism embodying a shaft, supporting-arms applied to the shaft, and chopping-blades mounted upon the supporting-arms and adapted for adjustment so as to strike out or thin the plants or growth to the extent desired by the operator.

The invention contemplates suitable means for adjusting the arms and for facilitating attachment and detachment of the chopping-blades.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a top plan view of the invention. Fig. 2 is a vertical longitudinal sectional view. Fig. 3 is a rear elevation. Fig. 4 is a detail view bringing out more clearly the means for attaching the chopping-blades to the supporting-arms therefor. Fig. 5 is a detail view showing the ratchet mechanism connecting the wheels with the axle.

Corresponding and like parts are referred to in the following description and indicated in all the views of the drawings by the same reference characters.

In the drawings the draft-tongue of the implement is designated 1, and the frame carrying the chopping mechanism is indicated at 2. The frame 2 is peculiarly mounted upon the tongue 1, the rear cross-bar of the frame having pivotal connection with an arched supporting-bar 3, as shown most clearly in Fig. 3 of the drawings. The upper central portion of the bar 3 is firmly attached by suitable fastenings to the rear portion of the tongue 1, and said bar 3 forms a rigid means for holding the frame of the chopping mechanism in proper relative position as regards the tongue under actual working conditions. The frame 2 is connected at its front end by a rod 4, which passes upwardly from the tongue 1 from the front cross-bar of the frame. The rod 4 is adapted for slidable movement through the tongue 1, and a spring 5 is interposed between the collar 6 on the rod 4 and the tongue 1, so as to normally hold the rod in a predetermined position. The rod 4 affords a flexible connection between the front end of the implement and the tongue 1, the advantages of which will appear more fully hereinafter.

The axle 7 of the implement is carried by the frame 2, said frame having suitable boxes to afford bearings for the axle and permit revolution of the latter as the implement is being advanced. Ground-wheels 8 are mounted at the ends of the axle 7, and said ground-wheels are adapted to rotate the axle when the chopper is advancing, being so connected, however, as to turn freely upon the axle without imparting movement to the latter when the implement is being backed. A toothed disk 9 is secured to the axle 7 at each end thereof, and the wheels are provided with suitable pawls 10, normally held in engagement with the notched disk 9 by springs 11. An annulus consisting preferably of a circular plate 12 surrounds the disk 9 and is provided with lateral pins or projections 13, so arranged that when the annulus is turned or revolved a short distance the pins 13 will engage beneath the pawls 10 and disengage the latter from the notches of the member 9. A handle 14 projects from the annulus 12, and a recessed spring 15 applied to the wheel is adapted to engage the handle 14 and hold the annulus 12 in an ascertained position with the pins 13 either in or out of engagement with the pawls 10, as the case may be.

When it is desired that the chopping mechism, which is actuated by means deriving motion from the axle 7, be thrown out of operation, it will be readily seen that the handles 14 may be operated so as to disengage the pawls 10 from the disks 9, whereupon the wheels 8 will freely turn without communicating motion to the axle 7. When the vehicle is being backed, the pawls 10 will freely ride over the notches of the disks 9 without operably connecting the wheels with the axles 7.

A main gear-wheel 16 is mounted upon the axle 7 between the ends of the latter, and said gear 16 meshes with a bevel-pinion 17 at the end of a short shaft 18, mounted in suitable bearings in the front cross-bar of the frame 2 and an intermediate cross-bar adjacent thereto. The shaft 18 carries the chopper, which consists, essentially, of a plurality of arms 20, extending radially from the shaft 18 in spaced relation, said arms being connected at their outer ends by blades 21, secured thereto. The arms 20 are of peculiar formation, being made in sections, (indicated at $20^a$ and $20^b$.) The section $20^b$ of the arms 20 consists, essentially, of a short plate secured at its opposite ends to the section $20^a$ by means of transverse screws or fastenings 22. It will thus be apparent that the sections constituting the arms 20 are readily detachable from the shaft 18, and the sections of the arms are provided with sockets 23 to receive the shaft 18. Further, it is apparent that the sectional formation of the arms 20 admits of quick adjustment of said arms, so as to arrange the blades carried by opposite ends thereof in various positions, as found best under actual conditions of service. The blades 21 are provided at the ends thereof with socket members 24, adapted to receive the extremities of the arms 20. The socket members 24 are tubular, so as to receive an end of the arm 20, each socket member having a set-screw 25, by which it is secured to the frame upon which it is mounted. The blades 21 are attached to the socket members in any preferred manner, and it will be readily noted that by operation of the set-screws 26 the various blades may be adjusted longitudinally of the arms 20, so as to vary the thinning operation according to necessities arising in the actual use of the implement.

The mounting of the frame 2 is such that should the blades 21 come into contact with an obstruction the flexible connection between the front of the frame 2 and the tongue 1 will permit the part 2 to give or yield, according to the size of the obstruction. Suitable braces 26 extend from the rear portion of the frame 2 upwardly and forwardly to points of attachment with the tongue 1.

The cultivating devices used in connection with the cotton-chopper comprise the beams 27, having pivotal connection at their front ends with the rear bar of the frame 2. The beams 27 are arranged in spaced relation and are provided with a suitable shovel 28, operating between the rows of cotton-plants to accomplish the usual function. Handles 29 extend rearwardly from the beams 27 and have braces 30 connecting the same with said beams. Hooks 31 depend from the rear end portion of the tongue 1, and these hooks may be engaged with the handles 29 of the cultivating devices, so as to hold the shovels 28 above the ground when not being used.

Having thus described the invention, what is claimed as new is—

1. In a cotton-chopper, the combination of a tongue, a supporting-frame, an axle mounted in said frame, ground-wheels, a rigid bar connecting the rear of the frame with the tongue, a rod connected at one end with the front of the frame and at its opposite end with the tongue, a collar upon the rod, a spring interposed between the tongue and the collar aforesaid, and normally holding the frame in a predetermined position, and a chopper carried by the frame.

2. In a cotton-chopper, the combination of a tongue, a supporting-frame comprising side and cross bars, a bar connecting the rear of the frame with the tongue, a rod connected at its lower end with the front of the frame and having its upper end passing through the tongue, a collar arranged in the length of the rod between the frame and the tongue, a spring interposed between the tongue and the collar aforesaid, an axle mounted on said frame, ground-wheels, a shaft arranged at the front portion of the frame and deriving motion from the axle aforesaid, a plurality of arms projected from the shaft, and blades carried by said arms.

3. In a cotton-chopper, the combination of a tongue, a supporting-frame comprising side and cross bars, an arched bar connecting the rear of the frame with the tongue, a rod connected at its lower end with the front of the frame and having its upper end passing through the tongue, a collar arranged in the length of the rod between the frame and the tongue, a spring interposed between the tongue and the collar aforesaid, an axle mounted on said frame, ground-wheels, a shaft arranged at the front portion of the frame and deriving motion from the axle aforesaid, a plurality of arms projected from the shaft, and blades having adjustable connection with the ends of said arms.

4. In a cotton-chopper, the combination of a draft-tongue, a supporting-frame, a chopper mounted in said frame, and comprising a shaft, a plurality of arms projected from said shaft, adjustable socket members at the outer extremities of the arms, and blades carried by said socket members.

In testimony whereof I affix my signature in presence of two witnesses.

ROBERT C. LASTER. [L. S.]

Witnesses:
Wm. K. Stone,
W. E. Cooper.